United States Patent Office 3,028,357
Patented Apr. 3, 1962

---

3,028,357
VULCANIZATION OF BUTYL RUBBER WITH A HYDROCARBON-SUBSTITUTED DINUCLEAR PHENOL DIALCOHOL, AND PRODUCT OBTAINED THEREBY
Alvin F. Shepard, Le Roy, N.Y., assignor to Hooker Chemical Corporation, Niagara Falls, N.Y., a corporation of New York
No Drawing. Filed Sept. 23, 1958, Ser. No. 762,703
40 Claims. (Cl. 260—43)

This invention relates to a new and useful method of curing Butyl rubber and to novel Butyl rubber vulcanizates.

The concept of vulcanization discussed herein means the change of the Butyl rubber from its raw tacky state into a non-tacky elastic material.

Butyl rubber is a generic name applied to vulcanizable elastic copolymers of isobutylene and small amounts of diolefins, such as isoprene or butadiene. As disclosed in U.S. Patent 2,702,287, the term "Butyl rubber" encompasses vulcanizable rubbery copolymers of isobutylene and about 0.5–10% of conjugated diolefins containing 4 through 6 inclusive carbon atoms.

It is an object of this invention to provide a new method for vulcanizing Butyl rubber vulcanizates. It is an additional object of this invention to provide a method for vulcanizing Butyl rubber which method is a rapid, efficient one and one which does not entail the use or need of extraneous acidic additives.

There are two general methods of curing Butyl rubber. One is the use of sulfur and accelerators. The second is the use of compounds such as 2,6-dimethylol-4-hydrocarbon substituted phenols.

Both these methods suffer from practical disadvantages. The sulfur cure leaves the Butyl rubber containing small amounts of free sulfur and/or sulfur derivatives and this free sulfur or sulfur derivative may oxidize to corrosive sulfur acids or may attack materials used in conjunction with the rubber article. Also when uncombined sulfur is present in rubber compositions it may subsequently "bloom" to the surface of the cured article thereby impairing its appearance.

The use of phenolic curing agents of the type mentioned avoids the disadvantages of sulfur which have been recited. In addition, by the use of phenolic curing agents of the above type, it is possible to obtain cured Butyl rubber stocks having outstanding resistance to heat and to oxidation. The chief disadvantages of the above phenolic cure are that the phenolic agent either requires an impractically long cure or that an acidic substance, such as, for example, ferric chloride, stannous chloride, chlorosulfonated polyethylene, chloroprene polymer, brominated Butyl rubber and the like must be used to obtain practical cure speeds.

Acid materials, such as ferric chloride, are undesirable in many types of Butyl rubber articles. Such acidic materials attack and degrade conventional fibrous fillers such as nylon, cellulose, steel wire, etc. Additionally, acids attack steel molds, resulting in sticking and staining and the acids may later attack other objects with which the finished rubber parts come in contact.

Pertaining to the above referred to second method for curing Butyl rubber, it is known that dimethylol derivatives of para-substituted phenols may be used for this purpose. It is also known that use may be made of related resins, such as those formed by heating dimethylol derivatives of para-substituted phenols as described in Carswell, "Phenoplasts," published by Interscience Publishers, New York, 1950, on pages 17–22. The structures of the resins formed by heating dimethylol derivatives of para-substituted phenols are indicated by Carswell to be extremely complex. It is admitted that these complex resins can vulcanize Butyl and other rubbers, but they do so at a rather slow rate and many catalysts have been suggested to improve their curing speed.

It is likewise known from the literature that

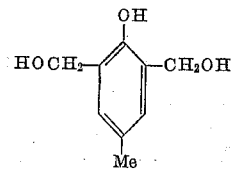

is an effective curing agent for natural rubber (S. van der Meer, Communication No. 44 of the Rubber-Stichting, Delft, Holland; Rubber Chemistry and Technology 20, 173–181 (1947)) while the related dinuclear compound

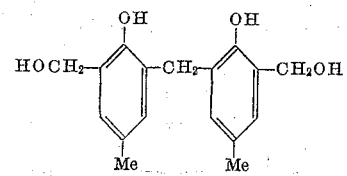

cures natural rubber very poorly.

Now it has been found, surprisingly, that the dinuclear compounds of the type

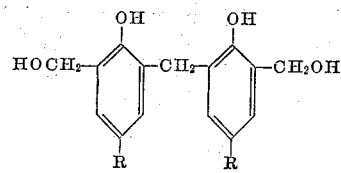

wherein R is selected from the group consisting of H, alkyl, cycloalkyl, aryl and aralkyl, are remarkably active curing agents for Butyl rubber, requiring no catalyst to attain commercial cure speeds. The dinuclear compounds of this particular type are far more effective curing agents than, for example, the resins formed by heating compounds of the type

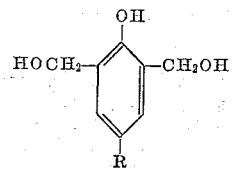

wherein R is selected from the group consisting of H, alkyl, cycloalkyl, aryl and aralkyl, or technical resinous products containing only moderate amounts of methylene linked dinuclear compounds of the type indicated.

The foregoing specific finding has additionally been experimented upon to discover the generic concepts involved in curing Butyl rubber. As a result of such experimentation, it has been found that all of the aforementioned objects may be accomplished by curing Butyl rubber with a phenolic dialcohol having two phenolic nuclei and which possesses the following structure:

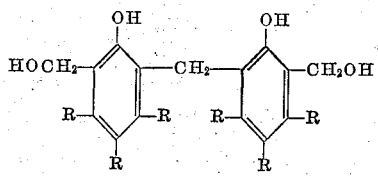

wherein R is selected from the group consisting of H, alkyl, cycloalkyl, aryl and aralkyl.

This generic structure embraces such structures as:

(I)
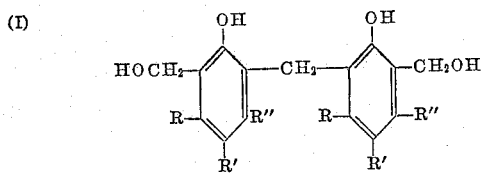

wherein R and R″ are selected from the group consisting of alkyl, cycloalkyl, aryl and aralkyl, and R′ is H;

(II)
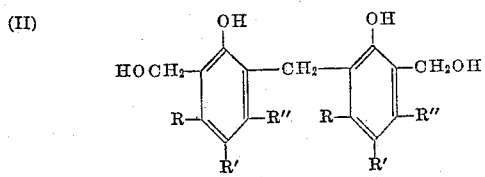

wherein R and R″ are H, and R′ is selected from the group consisting of alkyl, cycloalkyl, aryl and aralkyl; and (III)
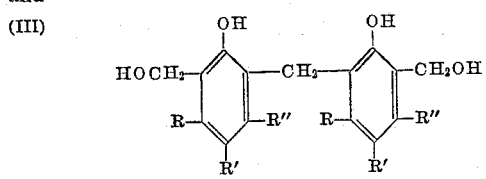

wherein R′ is selected from the group consisting of alkyl, cycloalkyl, aryl and aralkyl and R and R″ are selected from the group consisting of H, alkyl, cycloalkyl, aryl and aralkyl, one and one only of the substituents R and R″ being H.

Typical compounds embraced by Structure I can be pictured from the following naming of the R and R″ substituents:

| R-ethyl, | R″-isopropyl |
| R-ethyl, | R″-ethyl |
| R-methyl, | R″-isopropyl |
| R-methyl, | R″-secondary butyl |
| R-methyl, | R″-secondary amyl |
| R-ethyl, | R″-normal propyl |
| R-ethyl, | R″-normal butyl |
| R-ethyl, | R″-normal amyl |
| R-methyl, | R″-cyclohexyl |
| R-methyl, | R″-phenyl |
| R-methyl, | R″-benzyl; etc. |

Typical compounds embraced by above Structure II can be pictured from the following naming of the R′ substituent: methyl, ethyl, isopropyl, n-propyl, n-butyl, sec-butyl, iso-butyl, tertiary butyl, n-amyl, tertiary amyl, n-octyl, tertiary octyl, cyclohexyl, phenyl, benzyl, etc.

Typical compounds embraced by above Structure III can be pictured from the following naming of the R′, R and R″ substituents:

| R′-methyl, | R-methyl, | R″—H |
| R′-methyl, | R—H, | R″-methyl |
| R′-ethyl | R-methyl, | R″—H |
| R′-ethyl, | R—H, | R″-methyl |
| R′-methyl, | R-ethyl, | R″—H |
| R′-methyl, | R—H, | R″-ethyl |
| R′-isopropyl, | R-methyl, | R″—H |
| R′-isopropyl, | R—H, | R″-methyl |
| R′-ethyl, | R-isopropyl, | R″—H |
| R′-ethyl, | R—H, | R″-isopropyl |
| R′-isopropyl, | R-isopropyl, | R″—H |
| R′-isopropyl, | R—H, | R″-isopropyl |
| R′-methyl, | R-cyclohexyl, | R″—H |
| R′-methyl, | R—H, | R″-cyclohexyl |
| R′-phenyl, | R-isopropyl, | R″—H |
| R′-phenyl, | R—H, | R″-isopropyl |
| R′-isopropyl, | R-benzyl, | R″—H |
| R′-isopropyl, | R—H, | R″-benzyl |
| R′-cyclohexyl, | R-benzyl, | R″—H |
| R′-cyclohexyl, | R—H, | R″-benzyl |
| R′-benzyl, | R-isopropyl, | R″—H |
| R′-benzyl, | R—H, | R″-isopropyl, etc. |

In order to demonstrate the effectiveness of the vulcanizing agents of this invention and the non-effectiveness of various materials not embraced within the teachings of this invention in curing Butyl rubber, various phenols were investigated in the following formulation, wherein Butyl 325 is a commercial vulcanizable elastic copolymer of isobutylene and a small amount of isoprene, said copolymer containing 2.1 to 2.5 mole percent unsaturation, which corresponds to about three weight percent of isoprene:

|  | Parts by weight |
|---|---|
| Butyl 325 | 100 |
| HAF black | 50 |
| Stearic acid | 1 |
| Zinc oxide | 5 |
| Phenol derivatives | 10 |

The formulations were blended on rolls at 65 to 75 degrees centigrade for 50 passes, and pressed in a 6″ x 6″ slab mold or a .025″ x .025″ micro bar mold at 320 degrees Fahrenheit, 267 p.s.i. for the length of time noted with the results obtained indicated in Chart I.

Chart I

| Example | Phenol used | Number of Nuclei | Type of Linkage | 7½″ T | 7½″ E | 15″ T | 15″ E | 30″ T | 30″ E | 45″ T | 45″ E | 60″ T | 60″ E | Embraced Within This Invention | Structure Type |
|---|---|---|---|---|---|---|---|---|---|---|---|---|---|---|---|
| 1 | p-t-Bu | 2 | CH₂ | 869 | 765 | 1,446 | 723 | 2,168 | 617 | 2,207 | 541 | 2,250 | 510 | yes | II |
| 2 | di-isoPr | 2 | CH₂ | | | | | | | | | 2,088 | 580 | yes | I |
| 3 | 3,4-di Me | 2 | CH₂ | | | | | | | | | 1,272 | 680 | yes | III |
| 4 | p-t-Bu | 1 | None | | | | | | | | | too little to measure | | no | |
| 5 | di-isoPr | 1 | None | | | | | | | | | too little to measure | | no | |
| 6 | p-t-Bu | 2 | —CH₂OCH₂— | | | | | | | | | too little to measure | | no | |
| 7 | p-t-Bu* | Circa 2 ave. | probably —CH₂OCH₂— and some CH₂. | | | | | | | | | too little to measure | | no | |

T=Tensile p.s.i.
E=Elongation, percent.
* Made by heating 2,6-dimethylol-4-t-butyl phenol for 75 minutes at 125° C. until 0.49 mole of water (98% of theory for methylene ether formation) were evolved.

As can be seen from the foregoing chart, it is important that the material used to cure Butyl rubber fall strictly within the purview of the materials defined as workable. For example, the dinuclear dialcohols must be methylene linked and not methylene ether linked, as shown by Example 6. The material used cannot simply be a mononuclear dialcohol, as is shown by Examples 4 and 5. And the dialcohol used cannot be of a technical grade, as is shown by Example 7. In this specific example the material is described as technical for the following reasons:

(a) The phenol used, which was chiefly dinuclear, was not purified by crystallization and therefore, contains trinuclear compound together with still more complex substances;

(b) The starting mononuclear dialcohol was likewise not purified by crystallization but was merely precipitated, washed and dried;

(c) The analysis of the material which follows, shows that it is far from pure:

| | found | calc. for $C_{23}H_{32}O_4$ |
|---|---|---|
| mol. wt. | 340 | 372 |
| moisture_____percent__ | 0.87 | |
| ash_____do____ | 0.58 | |
| OH content_____do____ | 14.3 | 18.0 |
| M.P._____degrees__ | 60-65 | 110-112 |

Certain accepted and standard abbreviations have been used throughout the specification and in the claims, such as, for example, Me for methyl, n for normal, sec for secondary, t for tertiary, isoPr for isopropyl, sBu for secondary Butyl, Et for ethyl, tBu for tertiary Butyl, tAm for tertiary Amyl, tOct for tertiary Octyl, Ph for phenyl, p-t-Bu for para tertiary Butyl, di-isoPr for diisopropyl and so forth. It is believed that these abbreviations are all standard and will be readily identified and that they conform to those used in Chemical Abstracts.

It is to be understood that the invention is not limited to the specific examples which have been offered merely as illustrative and that modifications may be made within the scope of the appended claims without departing from the spirit of the invention.

I claim:

1. A vulcanized material comprising the reaction product between Butyl rubber and a vulcanizing agent having the formula:

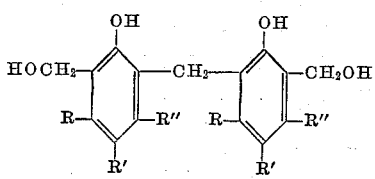

wherein R, R' and R" are selected from the group consisting of H, alkyl, cycloalkyl, aryl and aralkyl and only two of the substituents R, R' and R" attached to a single phenolic nucleus may be H, the Butyl rubber being a vulcanizable rubbery copolymer of isobutylene and about 0.5–10% of a conjugated diolefin containing 4 through 6 inclusive carbon atoms.

2. The vulcanized material of claim 1 wherein only R is H.

3. The vulcanized material of claim 1 wherein only R' is H.

4. The vulcanized material of claim 1 wherein only R and R" are H.

5. The vulcanized material of claim 1 wherein only R" is H.

6. A vulcanized material according to claim 1 wherein the vulcanizing agent is:

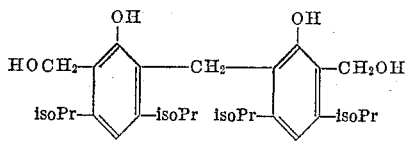

wherein the substituents -isoPr are monovalent isopropyl radicals.

7. A vulcanized material according to claim 1 wherein the vulcanizing agent is:

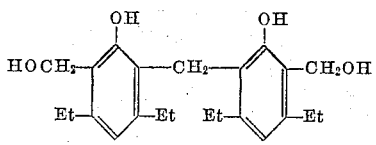

wherein the substituents -Et are monovalent ethyl radicals.

8. A vulcanized material according to claim 1 wherein the vulcanizing agent is:

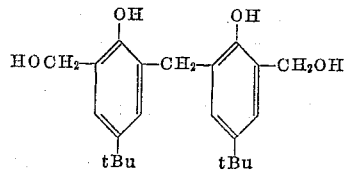

wherein the substituents -tBu are monovalent tertiary Butyl radicals.

9. A vulcanized material according to claim 1 wherein the vulcanizing agent is:

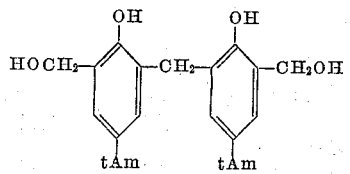

wherein the substituents -tAm are monovalent tertiary amyl radicals.

10. A vulcanized material according to claim 1 wherein the vulcanizing agent is:

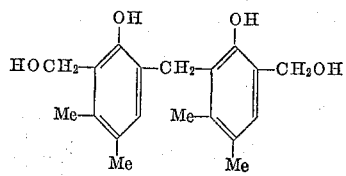

wherein the substituents -Me are monovalent methyl radicals.

11. The vulcanized material of claim 1 wherein the Butyl rubber is a vulcanizable rubbery copolymer of isobutylene and a conjugated diolefin selected from the group consisting of isoprene and butadiene.

12. The vulcanized material of claim 2 wherein the Butyl rubber is a vulcanizable rubbery copolymer of isobutylene and a conjugated diolefin selected from the group consisting of isoprene and butadiene.

13. The vulcanized material of claim 3 wherein the Butyl rubber is a vulcanizable rubbery copolymer of isobutylene and a conjugated diolefin selected from the group consisting of isoprene and butadiene.

14. The vulcanized material of claim 4 wherein the Butyl rubber is a vulcanizable rubbery copolymer of isobutylene and a conjugated diolefin selected from the group consisting of isoprene and butadiene.

15. The vulcanized material of claim 5 wherein the Butyl rubber is a vulcanizable rubbery copolymer of isobutylene and a conjugated diolefin selected from the group consisting of isoprene and butadiene.

16. The vulcanized material of claim 6 wherein the Butyl rubber is a vulcanizable rubbery copolymer of isobutylene and a conjugated diolefin selected from the group consisting of isoprene and butadiene.

17. The vulcanized material of claim 7 wherein the Butyl rubber is a vulcanizable rubbery copolymer of isobutylene and a conjugated diolefin selected from the group consisting of isoprene and butadiene.

18. The vulcanized material of claim 8 wherein the Butyl rubber is a vulcanizable rubbery copolymer of isobutylene and a conjugated diolefin selected from the group consisting of isoprene and butadiene.

19. The vulcanized material of claim 9 wherein the Butyl rubber is a vulcanizable rubbery copolymer of isobutylene and a conjugated diolefin selected from the group consisting of isoprene and butadiene.

20. The vulcanized material of claim 10 wherein the Butyl rubber is a vulcanizable rubbery copolymer of isobutylene and a conjugated diolefin selected from the group consisting of isoprene and butadiene.

21. A method of vulcanizing Butyl rubber which comprises the steps of intimately admixing in the polymer a vulcanizing agent having the formula:

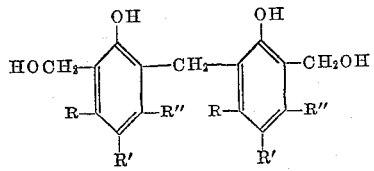

wherein R, R' and R" are selected from the group consisting of H, alkyl, cycloalkyl, aryl and aralkyl and only two of the substituents R, R' and R" attached to a single phenolic nucleus may be H; and vulcanizing the resulting admixture by heating to a vulcanizing temperature the Butyl rubber being a vulcanizable rubbery copolymer of isobutylene and about 0.5–10% of a conjugated diolefin containing 4 through 6 carbon atoms.

22. The method of vulcanizing Butyl rubber of claim 21 wherein only R is H.

23. The method of vulcanizing Butyl rubber of claim 21 wherein only R' is H.

24. The method of vulcanizing Butyl rubber of claim 21 wherein only R and R" are H.

25. The method of vulcanizing Butyl rubber of claim 21 wherein only R" is H.

26. A method of vulcanizing Butyl rubber according to claim 21 wherein the vulcanizing agent is:

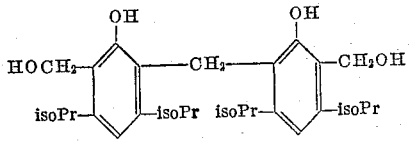

wherein the substituents -isoPr are monovalent isopropyl radicals.

27. A method of vulcanizing Butyl rubber according to claim 21 wherein the vulcanizing agent is:

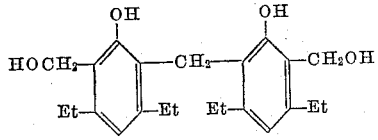

wherein the substituents -Et are monovalent ethyl radicals.

28. A method of vulcanizing Butyl rubber according to claim 21 wherein the vulcanizing agent is:

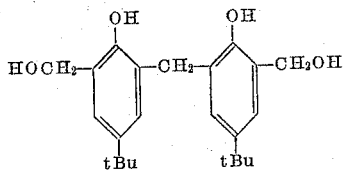

wherein the substituents -tBu are monovalent tertiary Butyl radicals.

29. A method of vulcanizing Butyl rubber according to claim 21 wherein the vulcanizing agent is:

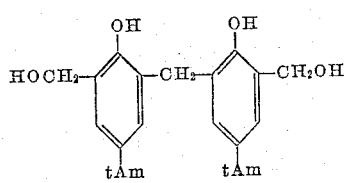

wherein the substituents -tAm are monovalent tertiary amyl radicals.

30. A method of vulcanizing Butyl rubber according to claim 21 wherein the vulcanizing agent is:

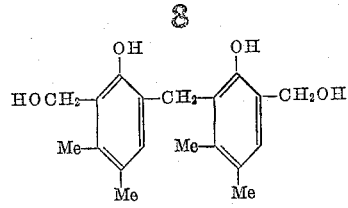

wherein the substituents -Me are monovalent methyl radicals.

31. The method of vulcanizing Butyl rubber of claim 21 wherein the Butyl rubber is a vulcanizable rubbery copolymer of isobutylene and a conjugated diolefin selected from the group consisting of isoprene and butadiene.

32. The method of vulcanizing Butyl rubber of claim 22 wherein the Butyl rubber is a vulcanizable rubbery copolymer of isobutylene and a conjugated diolefin selected from the group consisting of isoprene and butadiene.

33. The method of vulcanizing Butyl rubber of claim 23 wherein the Butyl rubber is a vulcanizable rubbery copolymer of isobutylene and a conjugated diolefin selected from the group consisting of isoprene and butadiene.

34. The method of vulcanizing Butyl rubber of claim 24 wherein the Butyl rubber is a vulcanizable rubbery copolymer of isobutylene and a conjugated diolefin selected from the group consisting of isoprene and butadiene.

35. The method of vulcanizing Butyl rubber of claim 25 wherein the Butyl rubber is a vulcanizable rubbery copolymer of isobutylene and a conjugated diolefin selected from the group consisting of isoprene and butadiene.

36. The method of vulcanizing Butyl rubber of claim 26 wherein the Butyl rubber is a vulcanizable rubbery copolymer of isobutylene and a conjugated diolefin selected from the group consisting of isoprene and butadiene.

37. The method of vulcanizing Butyl rubber of claim 27 wherein the Butyl rubber is a vulcanizable rubbery copolymer of isobutylene and a conjugated diolefin selected from the group consisting of isoprene and butadiene.

38. The method of vulcanizing Butyl rubber of claim 28 wherein the Butyl rubber is a vulcanizable rubbery copolymer of isobutylene and a conjugated diolefin selected from the group consisting of isoprene and butadiene.

39. The method of vulcanizing Butyl rubber of claim 29 wherein the Butyl rubber is a vulcanizable rubbery copolymer of isobutylene and a conjugated diolefin selected from the group consisting of isoprene and butadiene.

40. The method of vulcanizing Butyl rubber of claim 30 wherein the Butyl rubber is a vulcanizable rubbery copolymer of isobutylene and a conjugated diolefin selected from the group consisting of isoprene and butadiene.

References Cited in the file of this patent

UNITED STATES PATENTS

| | | |
|---|---|---|
| 2,702,287 | Iknayan et al. | Feb. 15, 1955 |
| 2,808,445 | D'Amico | Oct. 1, 1957 |
| 2,813,843 | Shepard et al. | Nov. 19, 1957 |
| 2,898,321 | Shepard | Aug. 4, 1959 |
| 2,898,322 | Shepard | Aug. 4, 1959 |
| 2,918,448 | Viohl | Dec. 22, 1959 |

OTHER REFERENCES

Van der Meer: "The Vulcanization of Rubber With Phenol Formaldehyde Derivatives," Rec. trav. chim. 63, 147 (1944), page 150 relied on.

Rehner et al.: "Vulcanization Reactions in Butyl Rubber," Ind. Eng. Chem., volume 38, No. 5, May 1946, pages 500–6, page 500 relied on.